(12) United States Patent
Shimada et al.

(10) Patent No.: US 9,904,691 B2
(45) Date of Patent: Feb. 27, 2018

(54) INFORMATION PROCESSING DEVICE AND NON-TRANSITORY COMPUTER READABLE MEDIUM

(71) Applicant: FUJI XEROX CO., LTD., Tokyo (JP)

(72) Inventors: Yuhei Shimada, Yokohama (JP); Manabu Ueda, Yokohama (JP); Hiroyuki Hattori, Yokohama (JP); Yuichi Ueno, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 304 days.

(21) Appl. No.: 14/752,038

(22) Filed: Jun. 26, 2015

(65) Prior Publication Data

US 2015/0293944 A1    Oct. 15, 2015

Related U.S. Application Data

(63) Continuation of application No. PCT/JP2013/072787, filed on Aug. 27, 2013.

(30) Foreign Application Priority Data

Mar. 27, 2013   (JP) ................................ 2013-066546

(51) Int. Cl.
| | | |
|---|---|---|
| H04N 5/93 | (2006.01) | |
| H04N 5/77 | (2006.01) | |
| G06F 17/30 | (2006.01) | |
| G11B 27/11 | (2006.01) | |
| H04N 5/76 | (2006.01) | |
| H04N 9/82 | (2006.01) | |

(52) U.S. Cl.
CPC .... *G06F 17/30268* (2013.01); *G06F 17/3028* (2013.01); *G11B 27/11* (2013.01); *H04N 5/76* (2013.01); *H04N 9/8205* (2013.01)

(58) Field of Classification Search
CPC ........ G11B 27/11; H04N 9/8205; H04N 5/07; G06F 17/3028; G06F 17/30268
USPC ................ 386/278, 224, 281, 282, 290, 248
See application file for complete search history.

(56) References Cited

U.S. PATENT DOCUMENTS

| | | | | |
|---|---|---|---|---|
| 5,185,682 A | * | 2/1993 | Takahashi | ........ G11B 20/00007 360/60 |
| 2004/0047606 A1 | | 3/2004 | Mikawa | |
| 2006/0028561 A1 | | 2/2006 | Tsunoda | |

FOREIGN PATENT DOCUMENTS

| | | |
|---|---|---|
| JP | 2004-104429 A | 4/2004 |
| JP | 2004-234372 A | 8/2004 |
| JP | 2006-050172 A | 2/2006 |
| JP | 2006-109151 | 5/2006 |
| JP | 2006-127033 A | 5/2006 |

(Continued)

OTHER PUBLICATIONS

Nov. 26, 2013 Written Opinion issued in International Patent Application No. PCT/JP2013/072787.

(Continued)

*Primary Examiner* — Robert Chevalier
(74) *Attorney, Agent, or Firm* — Oliff PLC

(57) ABSTRACT

An information processing device includes a creating unit that creates correspondence information that, based on reproduction history information representing a date and time of reproduction of content information and photographing history information representing a date and time of photographing of image information, associates the content information with the image information.

8 Claims, 9 Drawing Sheets

(56) References Cited

FOREIGN PATENT DOCUMENTS

| | | |
|---|---|---|
| JP | 2007-013286 A | 1/2007 |
| JP | 2007-104109 A | 4/2007 |
| JP | 2008-279929 A | 11/2008 |
| WO | 2008/117348 A1 | 10/2008 |

OTHER PUBLICATIONS

Nov. 26, 2013 Search Report issued in International Application No. PCT/JP2013/072787.

\* cited by examiner

FIG. 3

111 CONTENT INFORMATION

| CONTENT ID | GUIDANCE TARGET ID | LATITUDE / LONGITUDE | GUIDANCE CONTENT |
|---|---|---|---|
| 01003 | 0001 | 35°20' /139°30' | THE BUILDING STRAIGHT AHEAD IS ... |
| 01004 | 0002 | 35°19' /139°30' | THIS IS ... |
| 01005 | 0003 | 35°19' /139°32' | ON YOUR RIGHT IS ... |

FIG. 4

112 REPRODUCTION HISTORY INFORMATION

| REPRODUCTION HISTORY ID | REPRODUCTION START TIME | REPRODUCTION END TIME | CONTENT ID |
|---|---|---|---|
| 0001 | 2012/03/15 10:00:00 | 2012/03/15 10:05:00 | 01003 |
| 0002 | 2012/03/15 12:00:56 | 2012/03/15 12:01:56 | 01004 |
| 0003 | 2012/03/16 9:00:03 | 2012/03/16 9:02:33 | 01005 |

FIG. 5

114 PHOTOGRAPHING HISTORY INFORMATION

| IMAGE INFORMATION ID | PHOTOGRAPHING TIME | FILE PATH | LATITUDE / LONGITUDE |
|---|---|---|---|
| 001 | 2012/03/15 10:07:00 | /sdcard/pict/001123.jpg | 35°20' /139°30' |

FIG. 6

115 CORRESPONDENCE INFORMATION

| IMAGE INFORMATION ID | CONTENT ID |
|---|---|
| 001 | 01003,01006 |

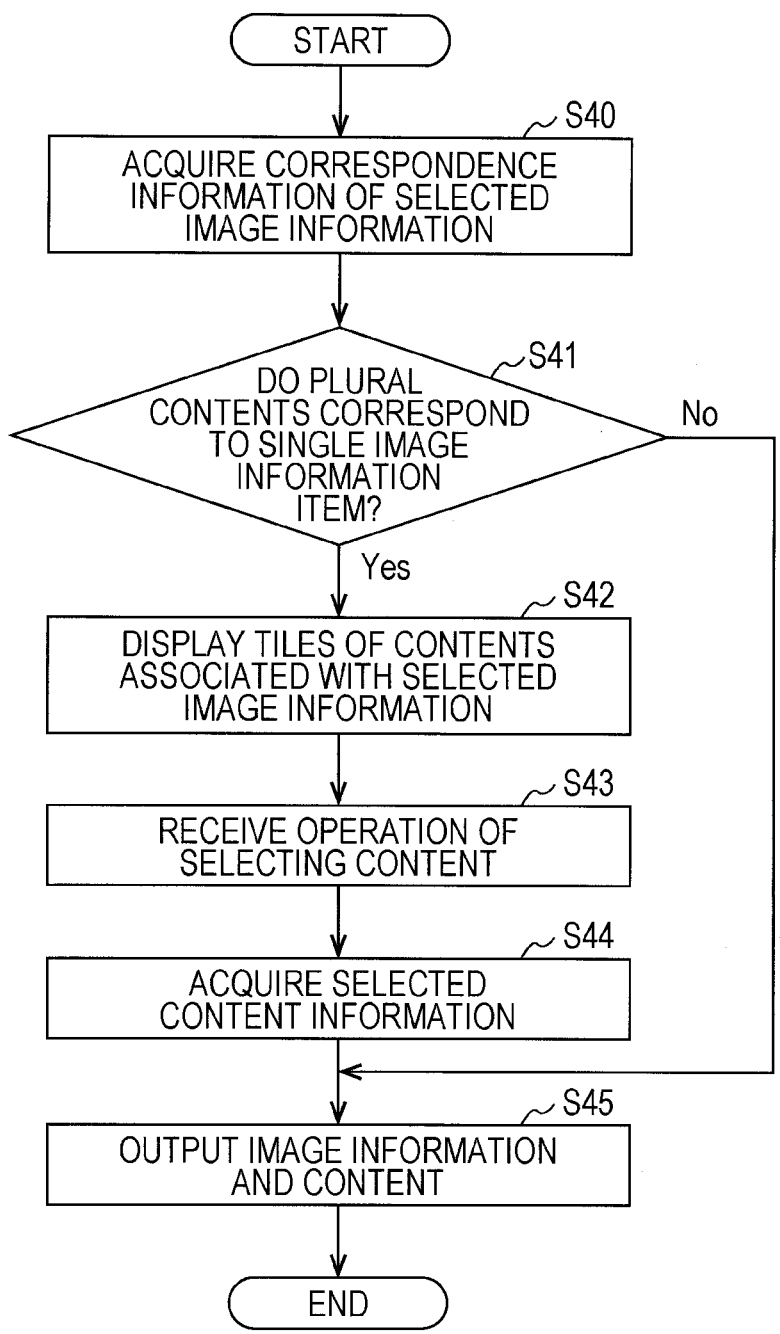

INFORMATION PROCESSING DEVICE AND NON-TRANSITORY COMPUTER READABLE MEDIUM

CROSS REFERENCE TO RELATED APPLICATION

This is a continuation of International Application No. PCT/JP2013/072787 filed on Aug. 27, 2013, and claims priority from Japanese Patent Application No. 2013-066546, filed on Mar. 27, 2013.

BACKGROUND

1. Technical Field

The present invention relates to an information processing device and a non-transitory computer readable medium.

2. Related Art

As an existing technology, an information processing device has been proposed which adds access information for accessing audio or video information related to image information registered by a user to the image information when printing the image information.

SUMMARY

An aspect of the present invention provides an information processing device including creating unit that creates correspondence information that, based on reproduction history information representing a date and time of reproduction of content information and photographing history information representing a date and time of photographing of image information, associates the content information with the image information.

BRIEF DESCRIPTION OF THE DRAWINGS

Exemplary embodiment(s) of the present invention will be described in detail based on the following figures, wherein

FIG. 3 is a schematic diagram illustrating an example of a configuration of content information;

FIG. 4 is a schematic diagram illustrating an example of a configuration of reproduction history information;

FIG. 5 is a schematic diagram illustrating an example of a configuration of photographing history information;

FIG. 6 is a schematic diagram illustrating an example of a configuration of correspondence information;

FIG. 10 is a flowchart illustrating an example of a content output operation of the information processing device;

DETAILED DESCRIPTION

Embodiment

Use Embodiment

Figure 1:
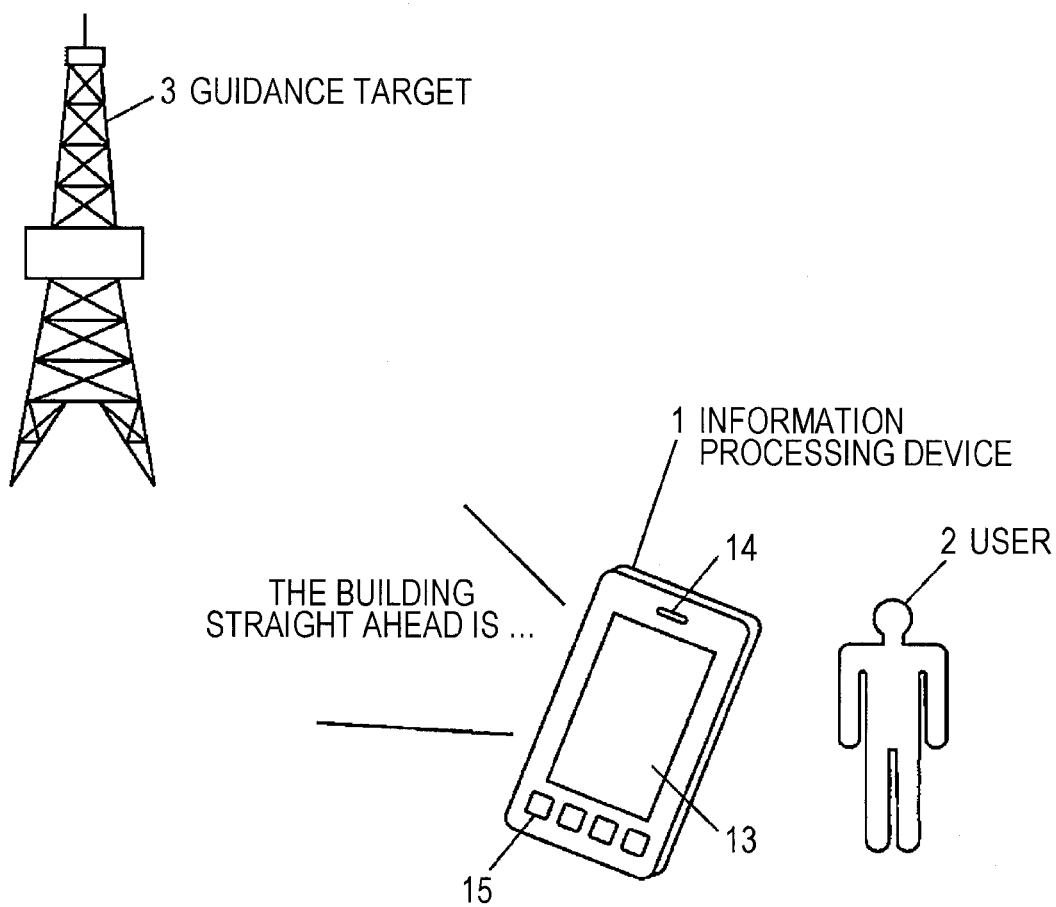
FIG. 1 is a schematic diagram illustrating an example of a use embodiment of an information processing device.
Figure 2:
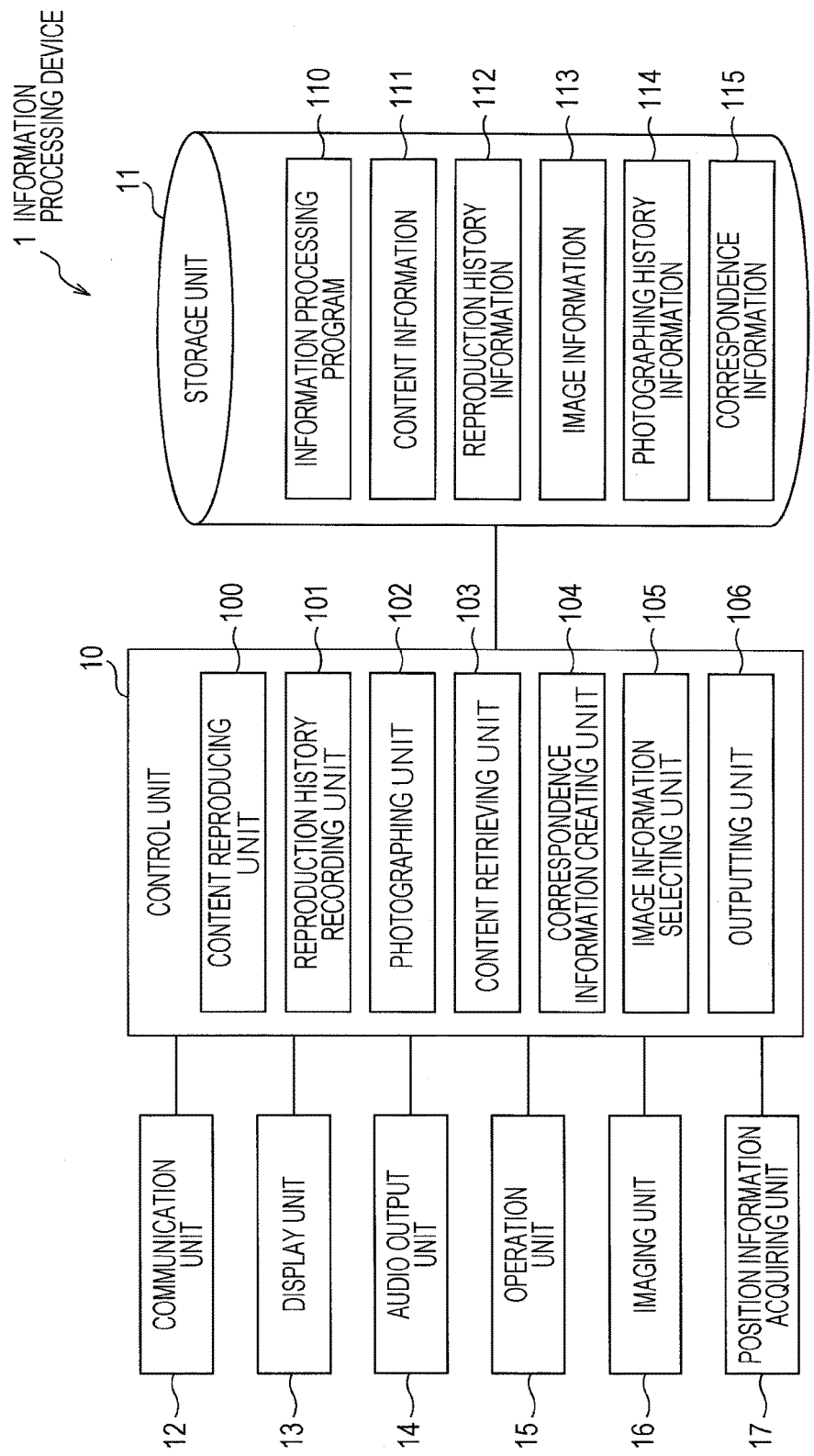
FIG. 2 is a block diagram illustrating an example of a configuration of the information processing device.

FIG. 1 is a schematic diagram illustrating an example of a use embodiment of an information processing device. Further, FIG. 2 is a block diagram illustrating an example of a configuration of an information processing device 1.

The information processing device 1 is carried by a user 2. When the user 2 enters a range in which guidance is provided on a guidance target 3, content information 111 previously registered in a built-in storage unit 11 is reproduced to provide guidance on the guidance target 3. For instance, the content information 111 for guidance is reproduced in audio and output from an audio output unit 14 of the information processing device 1. The user 2 moves by means of transportation such as foot, bicycle, automobile, train, ship, airplane, or rocket. Further, the content information 111 for guidance may be video, still image, text, or the like, or a combination thereof.

Further, the information processing device 1 includes an imaging unit 16, which generates image information 113 by imaging the guidance target 3 or the like in accordance with an operation performed by the user 2. The generated image information 113 is stored in the storage unit 11.

The information processing device 1 at least records the reproduction date and time of the content information 111 for guidance as reproduction history information 112 and the generation date and time of the image information 113 as photographing history information 114. The information processing device 1 further records position information at the time of reproducing the content information 111 for guidance and position information at the time of generating the image information 113.

Configuration of Information Processing Device

The information processing device 1 includes a control unit 10 that is formed of a CPU (Central Processing Unit) and so forth, controls respective units, and executes a variety of programs, the storage unit 11 as an example of a storage device that is formed of a recording medium such as an HDD (Hard Disk Drive) or a flash memory and stores information, a communication unit 12 that communicates with an external device via a network, a display unit 13 such as an LCD (Liquid Crystal Display), the audio output unit 14 that is formed of a speaker, an amplifier, and so forth and outputs audio, an operation unit 15 formed of a touch pad or a plurality of operation keys, the imaging unit 16 that generates the image information 113 by imaging, and a position information acquiring unit 17 that receives GPS (Global Positioning System) information as the position information of the device thereof.

The control unit 10 executes an information processing program 110 in the storage unit 11 to thereby function as a content reproducing unit 100, a reproduction history recording unit 101, a photographing unit 102, a content retrieving unit 103, a correspondence information creating unit 104, an image information selecting unit 105, an outputting unit 106, and so forth.

Based on the position information acquired by the position information acquiring unit 17, the content reproducing unit 100 reproduces the content information 111 previously registered in the storage unit 11 to provide guidance on the guidance target 3.

The reproduction history recording unit 101 at least records the date and time of reproduction of the content information 111 by the content reproducing unit 100 as the reproduction history information 112. In the present embodiment, the reproduction history recording unit 101 further records the position information acquired by the position information acquiring unit 17 at the time of reproduction of the content information 111 as the reproduction history information 112.

The photographing unit 102 controls the imaging unit 16 to image a photograph in accordance with an operation performed on the operation unit 15 by the user, and regenerates and records the image information 113. Further, the photographing unit 102 at least records the date and time of generation of the image information 113 as the photographing history information 114. In the present embodiment, the photographing unit 102 further records the position information acquired by the position information acquiring unit 17 at the time of generation of the image information 113 as the photographing history information 114.

The content retrieving unit 103 acquires the date and time of photographing of the image information 113 by referring to the photographing history information 114, and retrieves the content information 111 to be associated with the image information 113 based on the date and time of photographing by referring to the reproduction history information 112. The content retrieving unit 103 further retrieves the content information 111 to be associated with the image information 113 based on the position of photographing the image information 113 by referring to the reproduction history information 112.

The correspondence information creating unit 104 creates correspondence information 115 that associates the image information 113 with the content information 111 retrieved by the content retrieving unit 103.

The image information selecting unit 105 selects a single item or plural items of the image information 113 from the storage unit 11 in accordance with the operation performed on the operation unit 15 by the user.

The outputting unit 106 displays and outputs the item of the image information 113 selected by the image information selecting unit 105, and reproduces and outputs an item of the content information 111 associated with the item of the image information 113 based on the correspondence information 115.

The storage unit 11 stores the information processing program 110 for causing the control unit 10 to function as the above-described units 100 to 106, the content information 111 being content for guidance prepared for each guidance target, the reproduction history information 112 representing the history of reproduction of the content information 111, the image information 113 generated by the imaging unit 16, the photographing history information 114 representing the date and time and so forth of photographing of the image information 113 generated by the imaging unit 16, the correspondence information 115 representing the association between the content information 111 and the image information 113, and so forth.

The information processing device 1 may have a cloud computing configuration that causes an external server or the like to function as the reproduction history recording unit 101, the content retrieving unit 103, and the correspondence information creating unit 104, stores the content information 111, the reproduction history information 112, and the correspondence information 115 in an external storage unit, and provides the remaining configurations in the information processing device carried by the user. Further, the configurations provided in the information processing device 1 and the configurations provided in the external server may be switched as appropriate.

FIG. 3 is a schematic diagram illustrating an example of a configuration of the content information 111.

The content information 111 includes a content ID for identifying the content information 111, a guidance target ID for identifying the guidance target, latitude/longitude representing position information of the location of the guidance target, and guidance content of audio content that is reproduced for the guidance target.

The content information 111 is previously registered by an administrator of the information processing device 1, for example.

FIG. 4 is a schematic diagram illustrating an example of a configuration of the reproduction history information 112.

The reproduction history information 112 includes a reproduction history ID for identifying the reproduction history, a reproduction start time representing the start time of the reproduction of the content information 111, a reproduction end time representing the end time of the reproduction of the content information 111, and a content ID for identifying the content information 111.

FIG. 5 is a schematic diagram illustrating an example of a configuration of the photographing history information 114.

The photographing history information 114 includes an image information ID for identifying the image information 113 generated by photographing, a photographing time representing the time of photographing, a file path representing a storage destination of the image information 113 generated by photographing, and latitude/longitude of one of photographing.

FIG. 6 is a schematic diagram illustrating an example of a configuration of the correspondence information 115.

The correspondence information 115 includes an image information ID representing an identifier of the image information 113 associated with the content information 111 and a content ID representing an identifier of the content information 111 associated with the image information 113.

Operation of Information Processing Device

With reference to FIGS. 1 to 11, a description will now be given of the function of the present embodiment, as divided into (1) basic operation, (2) content retrieval operation, and (3) content reproduction operation.

(1) Basic Operation

The information processing device 1 is carried by the user 2. When the user 2 enters a range in which guidance is provided on the guidance target 3, the content reproducing unit 100 of the information processing device 1 reproduces the content information 111 previously registered in the storage unit 11 to provide guidance on the guidance target 3. The content reproducing unit 100 acquires the position information from the position information acquiring unit 17. If any item of the latitude/longitude in the content information 111 illustrated in FIG. 3 is close to the position information, the content reproducing unit 100 outputs guidance content in audio from the audio output unit 14.

Then, if the content reproducing unit 100 reproduces the content information 111, the reproduction history recording unit 101 records, in the reproduction history information 112 illustrated in FIG. 4, the content ID reproduced by the content reproducing unit 100 and the start time and the end time of the reproduction by adding thereto the reproduction history ID.

Further, the user 2 photographs the guidance target 3 by using the imaging unit 16 of the information processing device 1. The photographing unit 102 of the information processing device 1 generates the image information 113 by imaging the guidance target 3 or the like with the imaging unit 16 in accordance with the operation performed by the user 2. The generated image information 113 is stored in the storage unit 11.

Then, the photographing unit 102 records the time of photographing, the storage destination of the generated image information 113, and the position information of photographing in the photographing history information 114 illustrated in FIG. 5.

A description will be given below of an operation performed by the information processing device 1 when the user 2 operates the operation unit 15 of the information processing device 1 to select and display an item of the image information 113 on the display unit 13 and reproduce an item of the content information 111 associated with the selected item of the image information 113.

Figure 7:
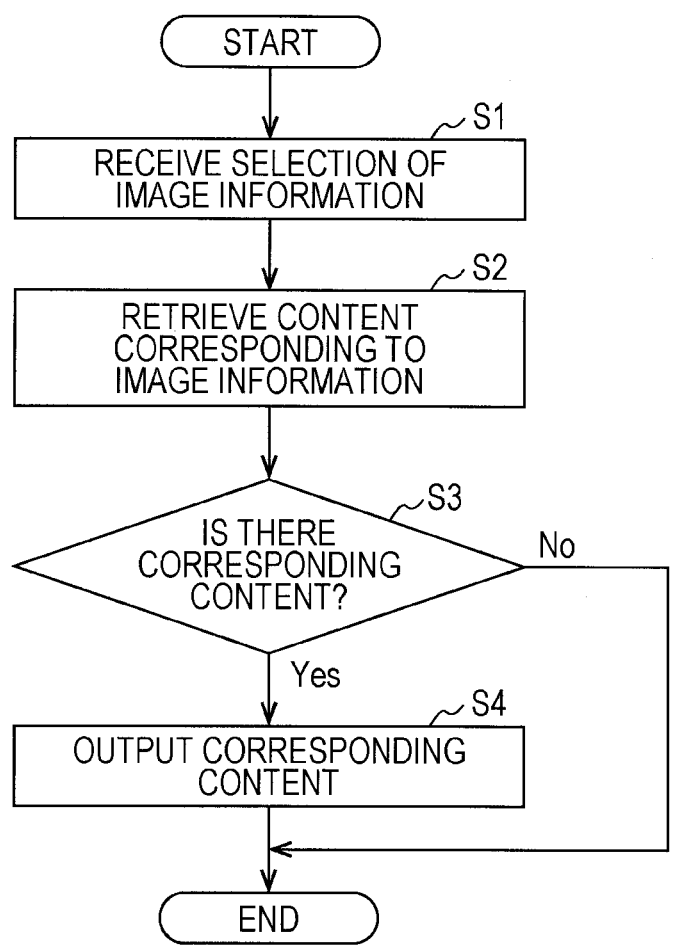
FIG. 7 is a flowchart illustrating an example of a basic operation of the information processing device.

FIG. 7 is a flowchart illustrating an example of the basic operation of the information processing device 1.

Firstly, the image information selecting unit 105 of the information processing device 1 displays a list of the image information 113 on the display unit 13 in accordance with the operation performed on the operation unit 15 by the user 2, and receives the selection of an item of the image information 113 from the list (S1).

Figure 11A:
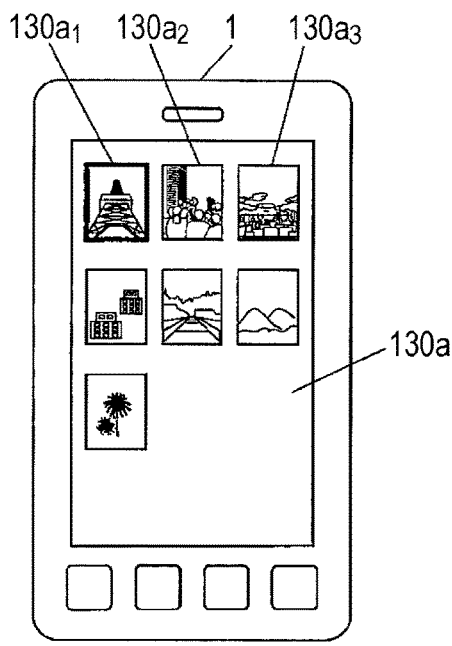
FIG. 11A is a schematic diagram illustrating an example of a configuration of a display unit when displaying a list of image information.

FIG. 11A is a schematic diagram illustrating an example of a configuration of the display unit 13 when displaying the list of the image information 113.

A list display 130a is displayed on the display unit 13, and displays thumbnails $130a_1$, $130a_2$, $130a_3$, and so forth of the image information 113.

Then, the content retrieving unit 103 retrieves an item of the content information 111 corresponding to the selected item of the image information 113 (S2). The retrieval operation of the content retrieving unit 103 will be described in detail in "(2) Content Retrieval Operation."

Then, if an item of the content information 111 corresponding to the selected item of the image information 113 exists (S3; Yes), the outputting unit 106 displays the selected item of the image information 113 on the display unit 13, and outputs the corresponding item of the content information 111 from the audio output unit 14 (S4). The output operation of the outputting unit 106 will be described in detail in "(3) Content Output Operation."

Figure 11B:
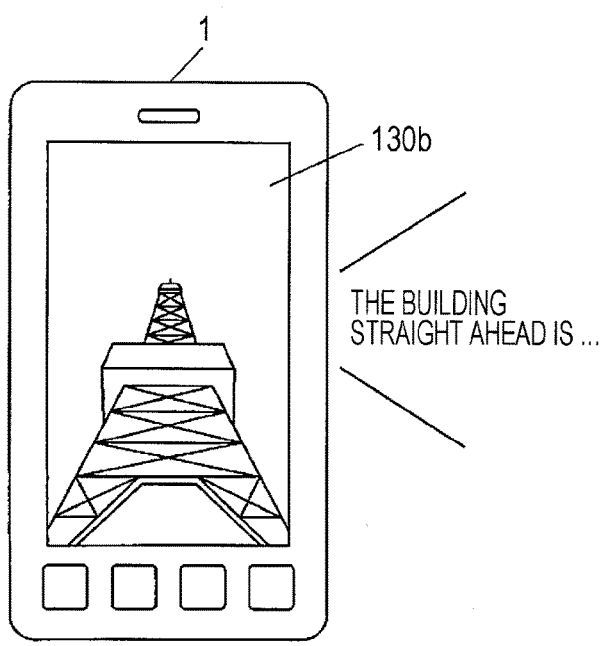
FIG. 11B is a schematic diagram illustrating an example of the configuration of the information processing device that displays a selected item of the image information and reproduces a content corresponding to the selected item of the image information.

FIG. 11B is a schematic diagram illustrating an example of the configuration of the information processing device 1 that displays the selected item of the image information 113 and reproduces the item of the content information 111 corresponding to the selected item of the image information 113.

A selected image display 130b displays the image information 113 selected from the thumbnails $130a_1$, $130a_2$, $130a_3$, and so forth in FIG. 11B. The audio output unit 14 of the information processing device 1 reproduces the corresponding item of the content information 111.

(2) Content Retrieval Operation

Details of the operation at step S2 in FIG. 7 will be described below.

Figure 8:
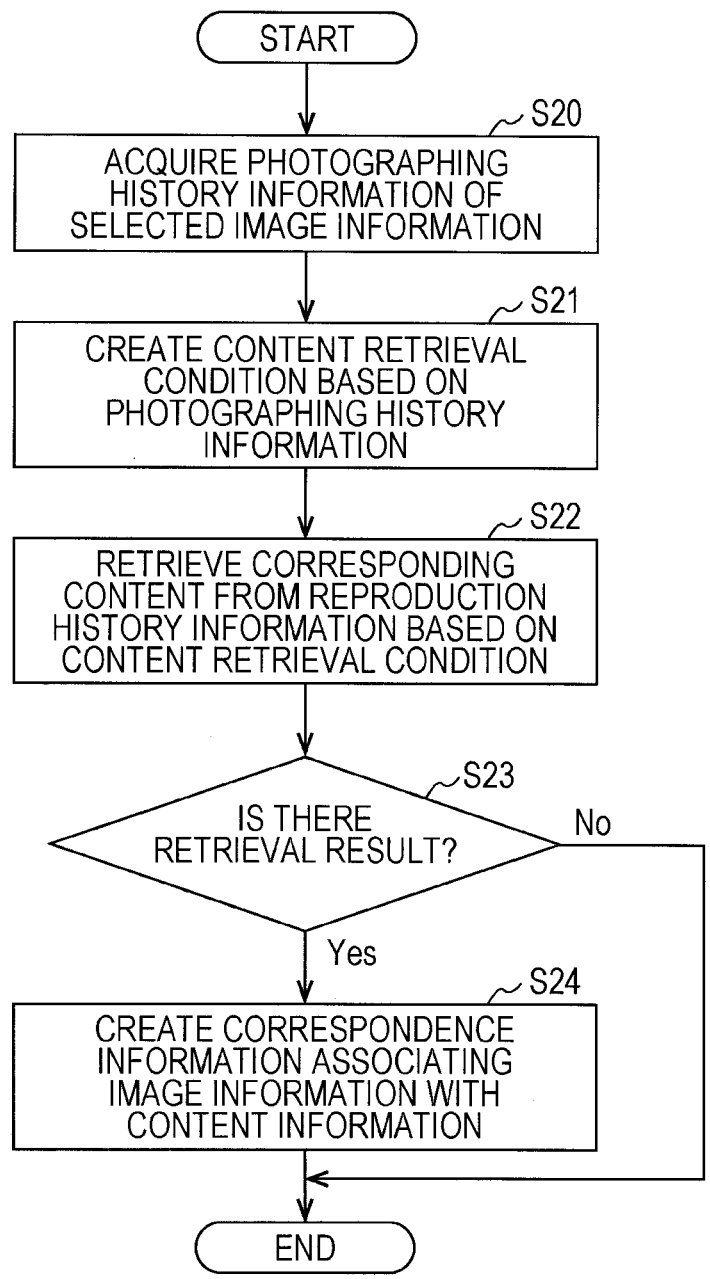
FIG. 8 is a flowchart illustrating an example of a content retrieval operation of the information processing device.

FIG. 8 is a flowchart illustrating an example of the content retrieval operation of the information processing device 1.

Firstly, the content retrieving unit 103 acquires the photographing history information 114 of the item of the image information 113 selected by the image information selecting unit 105 (S20).

If the image information ID of the selected item of the image information 113 described above is "001," the photographing time is "2012/03/15 10:07:00" according to the photographing history information 114 illustrated in FIG. 5.

Then, the content retrieving unit 103 creates a content retrieval condition based on the acquired photographing history information 114 (S21).

Since the photographing time in the acquired photographing history information 114 is "2012/03/15 10:07:00," the content retrieving unit 103 sets, as an example of the content retrieval condition, a time period "2012/03/15 10:04:00" to "2012/03/15 10:10:00" ranging from 3 minutes before the photographing time to 3 minutes after the photographing time to the time period in which the content information 111 is retrieved.

The content retrieving unit 103 then retrieves the corresponding item of the content information 111 from the reproduction history information 112 based on the created content retrieval condition (S22).

If a retrieval result is obtained by the retrieval at step S22 (S23; Yes), the correspondence information 115 is created which associates the selected item of the image information 113 with the item of the content information 111 as the retrieval result (S24).

Figure 9:
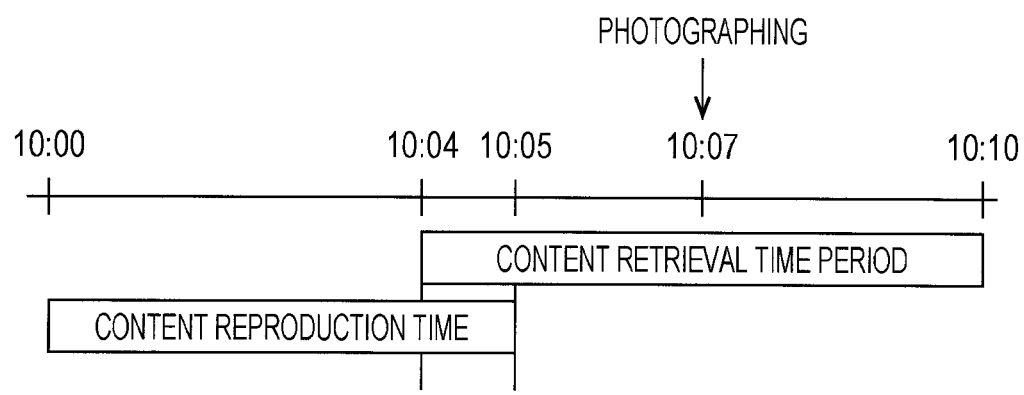
FIG. 9 is a schematic diagram illustrating an example of the relationship between a content retrieval time period as a content retrieval condition and a content reproduction time obtained from the reproduction history information.

FIG. 9 is a schematic diagram illustrating an example of the relationship between the content retrieval time period as the content retrieval condition and a content reproduction time obtained from the reproduction history information.

According to the reproduction history information 112 illustrated in FIG. 4, there is an overlap between the range from the reproduction start time "2012/03/15 10:00:00" to the reproduction end time "2012/03/15 10:05:00" of the reproduction history ID "0001" and the range "2012/03/15 10:04:00" to "2012/03/15 10:10:00" of the created content retrieval condition. Therefore, a content ID "01003" is associated with the image information ID "001."

If a plurality of retrieval results are obtained at step S23, the correspondence information 115 associating a plurality of items of the content information 111 with a single item of the image information 113 is created at step S24, as illustrated in FIG. 6.

Further, the operation of retrieving the content information 111 described in "(2) Content Retrieval Operation" may also be performed similarly based on the position information expressed in "latitude/longitude." In this case, a predetermined range centering on the "latitude/longitude" in the photographing history information 114 is set as the content retrieval condition at step S21, and the correspondence information creating unit 104 associates an item of the content information 111 having "latitude/longitude" included in the content retrieval condition with the item of the image information 113.

(3) Content Output Operation

Details of the operation at step S4 in FIG. 7 will be described below.

FIG. 10 is s flowchart illustrating an example of the content output operation of the information processing device 1.

Firstly, the outputting unit 106 acquires the correspondence information 115 of the selected item of the image information 113 (S40).

If a plurality of content IDs "01003" and "01006" correspond to a single item of the image information 113 (S41; Yes), as in the correspondence information 115 illustrated in FIG. 6, the outputting unit 106 displays titles of the plurality of items of the content information 111 on the display unit 13 (S42) to allow the user to select an appropriate item of the content information 111. The titles of items of the content information 111 are presettable. For example, "Tokyo Tower" is displayed for "01003," and "Shiba Park" is displayed for "01006."

If the user performs an operation of selecting an item of the content information 111, the outputting unit 106 receives the operation of selecting an item of the content information 111 (S43), and acquires the selected item of the content information 111 (S44). For example, if "Tokyo Tower" is selected, an item of the content information 111 for the content ID "01003" is acquired.

If a single item of the content information 111 corresponds to a single item of the image information 113 at step S41 (S41; No), the corresponding item of the content information 111 is acquired.

Then, the outputting unit 106 outputs the selected item of the image information 113 and the acquired item of the content information 111 (S45). Herein, as illustrated in FIG. 11B, the outputting unit 106 displays the selected item of the image information 113 on the display unit 13, and outputs the corresponding item of the content information 111 from the audio output unit 14.

In the foregoing embodiment, the time of creating the correspondence information 115 corresponds to the time of selection of the image information 113 by the image information selecting unit 105. The creation of the correspondence information 115, however, may be performed at any time after the generation of the image information 113 and the recording of the photographing history information 114. The any time may be immediately after the generation of the image information 113 and the recording of the photographing history information 114, or the creation of the correspondence information 115 may be performed periodically.

Other Embodiments

The present invention is not limited to the foregoing embodiment, and may be modified in various ways within a scope not departing from the gist of the present invention. For example, the method of outputting the image information 113 and the content information 111 performed by the outputting unit 106 at step S45 in FIG. 10 may be performed as in FIG. 12 or 13 described below.

Figure 12A:
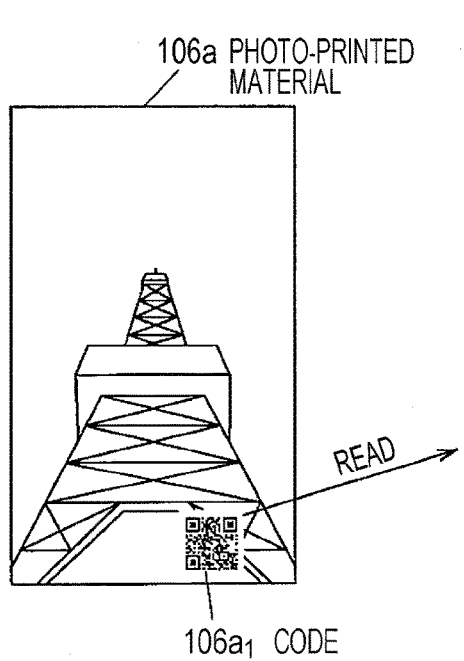
FIGS. 12A and 12B are schematic diagrams illustrating another example of a method of outputting the image information and the content information performed by an outputting unit.
Figure 12B:
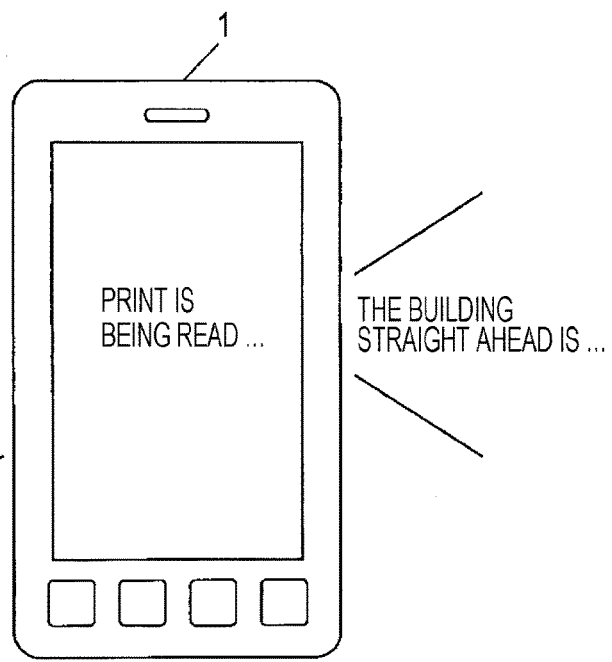

FIGS. 12A and 12B are schematic diagrams illustrating another example of the method of outputting the image information 113 and the content information 111 performed by the outputting unit 106.

As illustrated in FIG. 12A, the outputting unit 106 may add an optically readable code $106a_1$ to the image information 113 and print the image information 113 with a not-illustrated printer or the like, to thereby output the image information 113 as a photo-printed material 106a. The code $106a_1$ includes information for accessing the item of the content information 111 associated with the printed item of the image information 113.

The outputting unit 106 of the information processing device 1 reads the code $106a_1$ of the photo-printed material 106a with the imaging unit 16, to thereby acquire the corresponding item of the content information 111 and output the item of the content information 111 from the audio output unit 14, as illustrated in FIG. 12B.

Figure 13:
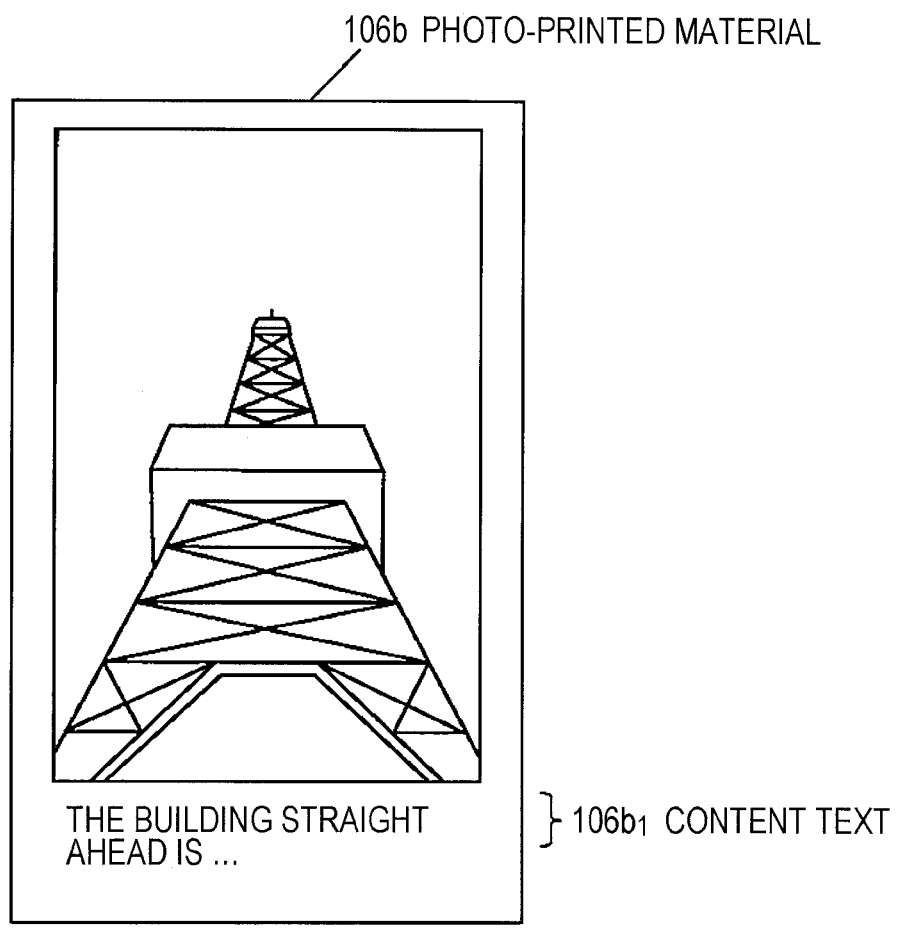
FIG. 13 is a schematic diagram illustrating another example of the method of outputting the image information and the content information performed by the outputting unit.

FIG. 13 is a schematic diagram illustrating another example of the method of outputting the image information 113 and the content information 111 performed by the outputting unit 106.

Further, as illustrated in FIG. 13, the outputting unit 106 may add content text $106b_1$, which is text converted from the guidance content of the content information 111 corresponding to the image information 113, to the image information 113 and print the image information 113 with a not-illustrated printer or the like, to thereby output the image information 113 as a photo-printed material 106b.

Although the functions of the respective units 100 to 106 of the control unit 10 are realized by a program in the foregoing embodiment, all or part of the unit may be realized by hardware such as an ASIC. Further, the program used in the foregoing embodiment may be provided as stored in a recording medium such as a CD-ROM. Further, replacement, removal, addition, and so forth of the forgoing steps described in the foregoing embodiment are possible within a scope not changing the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
    a storage unit that stores content information which guides a guidance target to be associated with a position of the guidance target;
    a position information acquiring unit that receives position information of the information processing device;
    a reproducing unit that reproduces the content information in response to the information processing device entering a predetermined range from the position of the guidance target; and
    a creating unit that creates correspondence information that, when time difference between a date and time of reproduction of the content information and a date and time of photographing of image information falls within a predetermined time range, associates the content information with the image information.

2. The information processing device according to claim 1,
    wherein the position information acquiring unit that acquires position information of the image information indicating a position of photographing of the image information, and
    wherein the creating unit creates the correspondence information when the position indicated by the position information of the image information is within the predetermined range from the position of the guidance target which is guided by the content information reproduced by the reproducing unit.

3. The information processing device according to claim 1, further comprising:

an outputting unit that, if an item of the image information is selected, displays the item of the image information, acquires an item of the content information corresponding to the selected item of the image information based on the correspondence information, and reproduces and outputs the item of the content information.

4. The information processing device according to claim 1, further comprising:

an outputting unit that, if an item of the image information is selected, retrieves an item of the content information corresponding to the selected item of the image information based on the correspondence information, and prints and outputs the item of the image information by adding thereto information for reproducing the item of the content information.

5. The information processing device according to claim 1, further comprising:

an outputting unit that, if an item of the image information is selected, acquires an item of the content information corresponding to the selected item of the image information based on the correspondence information, and prints and outputs the item of the image information by adding thereto text converted from the item of the content information.

6. A non-transitory computer readable medium storing an information processing program for causing a computer to function as:

a storage unit that stores content information which guides a guidance target to be associated with a position of the guidance target;

a position information acquiring unit that receives position information of the computer;

a reproducing unit that reproduces the content information in response to the computer entering a predetermined range from the position of the guidance target; and a creating unit that creates correspondence information that, when time difference between a date and time of reproduction of the content information and a date and time of photographing of image information falls within a predetermined time range, associates the content information with the image information.

7. An information processing device comprising:

an outputting unit that outputs content information which guides a guidance target, the content information being previously registered to be associated with a position of the guidance target;

a setting unit that sets at least one of predetermined time before a date and time of photographing of image information and predetermined time after the date and time thereof, and sets a time period in which the content information is retrieved on the basis of the at least one of the predetermined times; and a creating unit that creates correspondence information that, when a range from start time of output of the content information to end time of output of the content information partially overlaps with the time period set by the setting unit, associates the content information and the image information.

8. An information processing device comprising:

a position information acquiring unit that receives position information of the information processing device;

a reproducing unit that reproduces content information previously registered on the basis of the position information of the information processing device;

a reproduction history storing unit that stores a date and time of reproduction of the content information reproduced by the reproducing unit; and a creating unit that creates correspondence information that, on the basis of the date and time of reproduction of the content information and a date and time of photographing of image information, associates the content information and the image information.

* * * * *